United States Patent [19]

Ogawa

[11] Patent Number: 5,194,889
[45] Date of Patent: Mar. 16, 1993

[54] FLASHING DEVICE

[75] Inventor: Kimiaki Ogawa, Tokyo, Japan

[73] Assignee: Asahi Kogaku Kogyo Kabushiki Kaisha, Tokyo, Japan

[21] Appl. No.: 832,037

[22] Filed: Feb. 6, 1992

[30] Foreign Application Priority Data

Feb. 7, 1991 [JP] Japan ................................. 3-102199

[51] Int. Cl.⁵ ........................ G03B 15/05; H05B 41/32
[52] U.S. Cl. .................................. 354/418; 354/127.1; 315/241 P
[58] Field of Search ................. 354/418, 127.1, 127.11, 354/127.12, 145.1; 315/241 R, 241 P; 320/1

[56] References Cited

U.S. PATENT DOCUMENTS 5,016,038  5/1991  Kobayashi et al. ................. 354/418
5,034,662  7/1991  Nishida et al. ................ 354/127.1 X Primary Examiner—W. B. Perkey
Attorney, Agent, or Firm—Sandler Greenblum & Bernstein

[57] ABSTRACT

A flashing device for emitting light to an object, which has a light emitting member and a condenser that is charged to supply electricity to the light emitting member. The light emitting member is turned OFF when the light amount emitted to the object reaches a predetermined value. A residual voltage of the condenser after the light emitting member emits light is detected. A charging prohibit period is then determined in accordance with the detected residual voltage of the condenser, and the charging of the condenser is prohibited for the charging prohibit period after the light emitting member emits light.

18 Claims, 6 Drawing Sheets

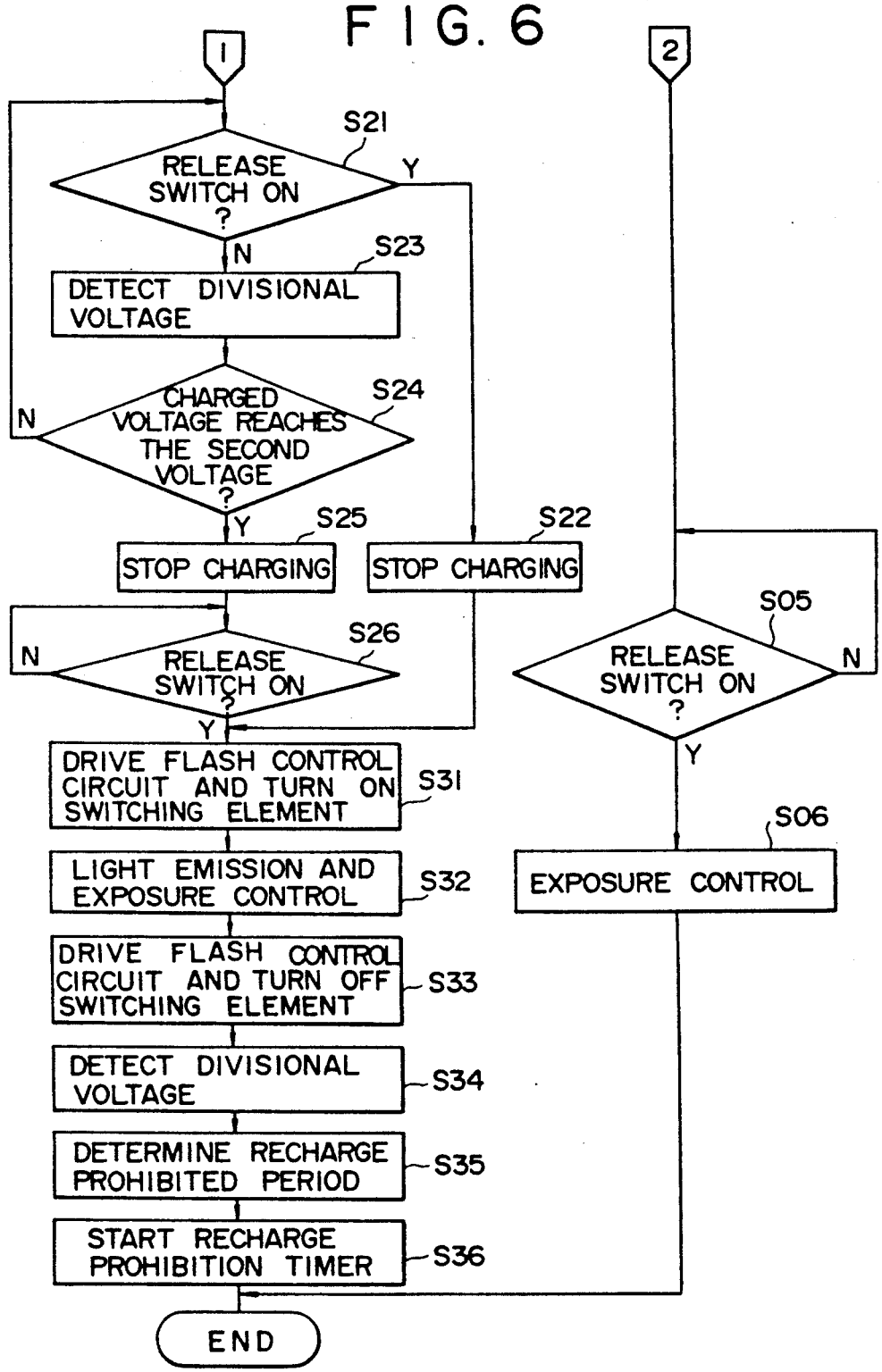

FLASHING DEVICE

BACKGROUND OF THE INVENTION

The present invention relates to a flashing device for cameras, and more particularly, to controlling a charging of a condenser for supplying electricity to a flash after the flash emits flash light.

A flashing device can emit light at a specified voltage (hereinafter referred to as a first voltage), however, it is desirable to apply a voltage (hereinafter referred to as the second voltage) which is higher than the first voltage to the flashing device, in order to obtain the maximum luminous energy of the flashing device.

Conventionally, charging of a condenser for supplying voltage to the flashing device is performed through a voltage increasing circuit which is connected with a power source. However, when the recharging of the condenser to the second voltage (hereinafter referred to as a full charge) and light emission of the flash are successively repeated, elements such as transistors or a transformer in the voltage increasing circuit are undesirably heated and the voltage increasing circuit may be burnt or damaged.

Therefore, in order to prevent such problems, a device is suggested in which recharging is prohibited for a predetermined period of time after charging has been finished or flash light has been emitted.

In such a device, however, in order to allow the flash light emission and full charge to be repeatedly performed, a recharge prohibited time should be specified for a sufficiently long period of time so that the voltage increasing circuit is not undesirably heated.

If the recharge prohibited period is specified for a long time, however, there may arises a problem that the flash light emission can not be used immediately after the light emission, and promptness of the flashing device become lowered.

SUMMARY OF THE INVENTION

It is therefore an object of the present invention to provide an improved flashing device in which the recharging of a condenser for supplying voltage of a flash light can be executed as soon as possible after the light emission with avoiding excessive heating of a voltage increasing circuit for charging the condenser.

For the above object, according to the present invention, there is provided a flashing device that cooperates with a camera for emitting light, comprising means for emitting light, a condenser that is chargeable and supplies electricity to the means for emitting light, and means for charging the condenser, the flashing device further comprising:

means for detecting a residual voltage of the condenser after the means for emitting emits light;

means for determining a charging prohibit period in accordance with the detected residual voltage of the condenser; and means for prohibiting the charging of the condenser for the charging prohibit period when it is determined by the determining means that the emitting means emits light.

Optionally, the means for determining a period of time determines the period in such a fashion that the lower the residual voltage of the condenser is, the longer the charging prohibited period is.

Further, the charging means stop charging when said condenser is charged to another predetermined voltage which is higher than the predetermined voltage.

Furthermore, the camera comprises discriminating means for discriminating whether flash light is to be emitted when shooting is executed, and wherein the means for emitting emits light when it is discriminated by the discriminating means that the flash light is necessary and when a shutter of the camera is driven.

Moreover, the means for emitting is capable of emitting light when the voltage of the condenser is higher than or equal to the predetermined voltage.

Still further, a charging means stops charging when the shutter is driven.

Further, the flashing device comprises an automatic strobe that is capable of controlling the amount of light emitted by the means for emitting.

According to a further aspect of the invention, there is provided a method of recharging the charging means provided in a flashing device after flash light is emitted, the flashing device having a condenser for supplying electricity to an illuminating means, the condenser being charged by the charging means, and a power source for supplying electricity to the charging means, the method comprising steps of:

detecting a residual voltage of the condenser after the flash light has been emitted;

determining a charging prohibit period in accordance with the residual voltage of the condenser; and prohibiting charging of the condenser for the charging prohibited period after the illuminating means has emitted light.

According to still another aspect of the invention, there is provided a camera having a flashing device for emitting light comprising means for emitting light, a condenser for being charged and supplying electricity to the illuminating means, and means for charging the condenser, the camera further comprising:

means for detecting a residual voltage of the condenser after the illuminating means emits light;

means for determining a charging prohibit period in accordance with the residual voltage of the condenser; and means for prohibiting the charging of the condenser for the charging prohibited period which is determined by the determining means after the means for emitting emits light.

According to a further aspect of the invention, there is provided a flashing device for emitting light, comprising means for emitting flash light, means for controlling the amount of the flash light, a condenser for being charged and supplying electricity to the means for emitting light, and means for charging the condenser, the flashing device further comprising:

means for detecting a residual voltage of the condenser after the means for emitting emits light;

means for determining a charging prohibit period in accordance with the detected residual voltage of the condenser; and means for prohibiting charging of the condenser for the charging prohibit period which is determined by the determining means after the means for emitting emits light.

According to still another aspect of the invention, there is provided a flashing device for emitting light to an object, comprising means for emitting light, a condenser for being charged and supplying electricity to the means for emitting, switch means for turning OFF the means for emitting when the amount of light emitted onto the object reaches a predetermined value, the flashing device further comprising:

means for detecting a residual voltage of the condenser when the means for emitting is turned OFF by the switch means;

means for determining a charging prohibit period in accordance with the detected residual voltage of the condenser; and means for prohibiting charging of the condenser for the charging prohibit period after the means for emitting has been turned OFF.

DESCRIPTION OF THE ACCOMPANYING DRAWINGS

FIGS. 5 and 6 show a flow chart illustrating a control of the photographing of a camera according to the present invention.

DESCRIPTION OF THE EMBODIMENTS

Figure 1:
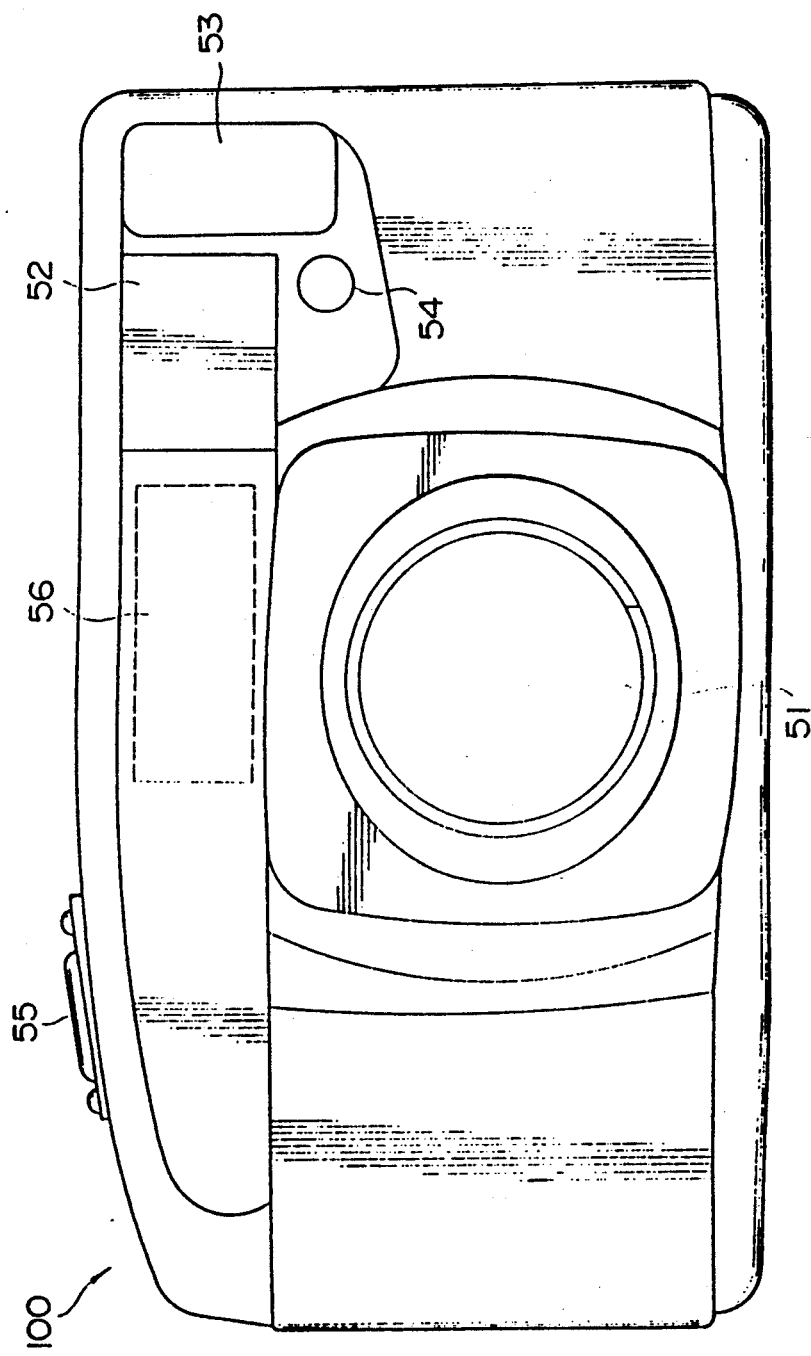
FIG. 1 is a front view of a camera having a flashing device embodying the present invention.

FIG. 1 shows a front view of a camera 100 that is provided with a flashing device embodying the present invention. The camera 100 is a compact type lens shutter camera which comprises a lens 51, a finder 52, a light emitting window 53 of the flashing device, a CdS sensor 54 for photometry sensing, a release button 55, and a distance measurement device 56.

Figure 2:
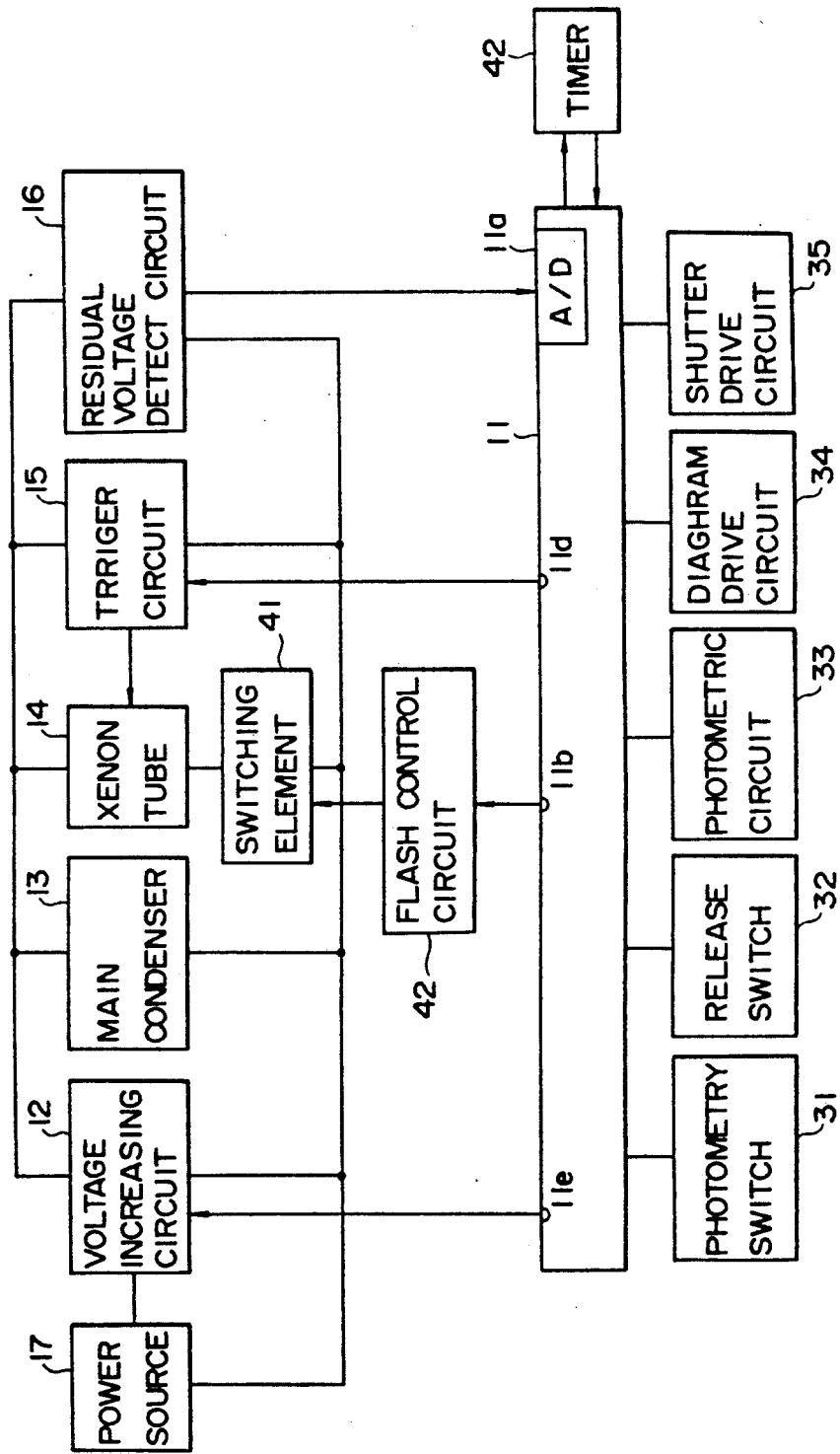
FIG. 2 is a block diagram of a camera of FIG. 1.

FIG. 2 shows a block diagram of the camera 100 of FIG. 1. A system controller 11 comprises a microcomputer for controlling a flashing device as well as various controls of the camera.

The flashing device comprises a voltage increasing circuit 12, a main condenser 13, a xenon tube 14, a trigger circuit 15, and a voltage detecting circuit 16 which are connected in parallel. With this construction, an accumulated voltage of the main condenser 13 (for example, 300 V) is applied to the xenon tube 14. The xenon tube 14 commences its discharge upon receiving a trigger voltage (for example, 4 kV) applied by a trigger circuit 15, and emits light at the luminous energy corresponding to the charged voltage of the main condenser 13. The trigger circuit 15 outputs the trigger voltage according to a trigger instruction signal inputted from port 11d of the system controller 11. The voltage increasing circuit 12 receives the voltage from a power source 17 and raises it, applies the raised voltage to the main condenser 13 for charging it. The charging starts when a switching element, such as a transistor in the voltage increasing circuit 12, is set to an ON state in response to a charge instruction signal which is inputted from port 11e of the system controller 11.

The voltage detecting circuit 16 detects the charged voltage of the main condenser 13, and outputs a signal corresponding to the charged voltage of the main condenser 13 to an A/D converter 11a of the system controller 11.

In the camera 100 of the present embodiment, a well-known automatic strobe is employed. In the automatic strobe, the light emission is stopped when a sufficient light amount is obtained. The automatic strobe is constructed as described below.

A switching element 41 is serially connected to the xenon tube 14, such that the voltage of the main condenser 13 is applied to the xenon tube 14 when the switching element 41 is turned ON. Accordingly, the xenon tube 14 is enabled to emit light, while the xenon tube 14 is disconnected when the switching element 41 is turned OFF. ON/OFF control of the switching element 41 is performed in response to a switching signal that is transmitted from a flash control circuit 42. The flash control circuit 42 obtains a luminance of the object while the xenon tube 14 is emitting light with use of a light receiving element (not shown). When sufficient light is accumulated in the light receiving element, outputs the OFF state of the switching signal to the switching element 41 in order to turn it OFF. Thus, the light emission of the xenon tube 14 is stopped when a sufficient luminance is obtained. At this stage, the main condenser 13 represents the voltage corresponding to a residual charge which has not been used for a light emission of the xenon tube 14. It should be noted that the flash control circuit 42 outputs a switching signal for turning ON the switching element 41 in response to a flash control signal that is transmitted from port 11b of the system controller 11 when the xenon tube emits light.

Figure 3:
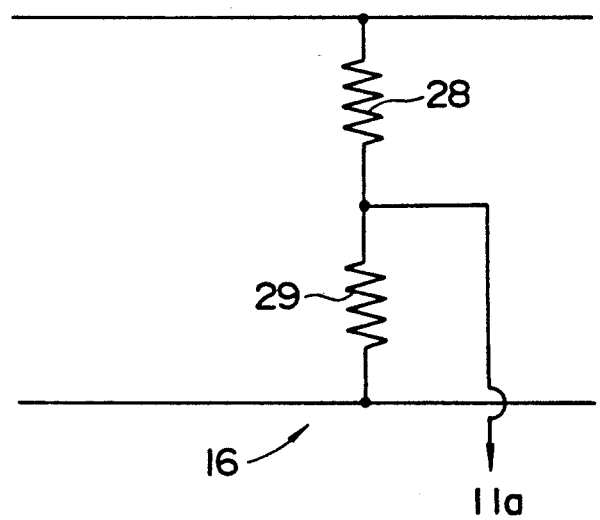
FIG. 3 shows a voltage detecting circuit for detecting a charged condition of a condenser used with the flashing device.

FIG. 3 shows an example of a composition of the charged voltage detecting circuit 16.

In FIG. 3, the charged voltage detecting circuit 16 is provided with a pair of resistors 28 and 29. One end of each of the resistors 28 and 29 are connected with each other, and the other ends thereof are connected with the main condenser 13, respectively. In other words, the pair of resistors 28 and 29 are connected with the main condenser 13 in parallel. Further, a point where the resistors 28 and 29 are connected is connected to the A/D converter 11a.

In FIG. 2, a photometric switch 31, a release switch 32, a photometric circuit 33, a diaphragm drive circuit 34 and a shutter drive circuit 35, which have been conventionally employed in cameras, are connected to the system controller 11, respectively.

The photometric switch 31 is turned ON when the release button 55 provided on camera body 100 is depressed half way. The release switch 32 is turned ON when the release button 55 is fully depressed. The photometric circuit 33 is activated when the photometric switch 31 is turned ON, and it obtains a luminance of the object. The system controller 11 executes a calculation of the adequate shutter speed, the aperture value, etc., in accordance with the obtained luminance of the object, film sensitivity and other information. In accordance with the result of the calculation of the system controller 11, the diaphragm drive circuit 34 drives the diaphragm. Thereafter, when the release switch 32 is turned ON, the shutter mechanism is driven in accordance with the calculated shutter speed, and the photographic shooting is carried out. The aforementioned shooting process is the process wherein the flashing device is not used.

When the flashing device is used in shooting, the aperture value and the shutter speed are set to predetermined values, respectively.

Figure 4:
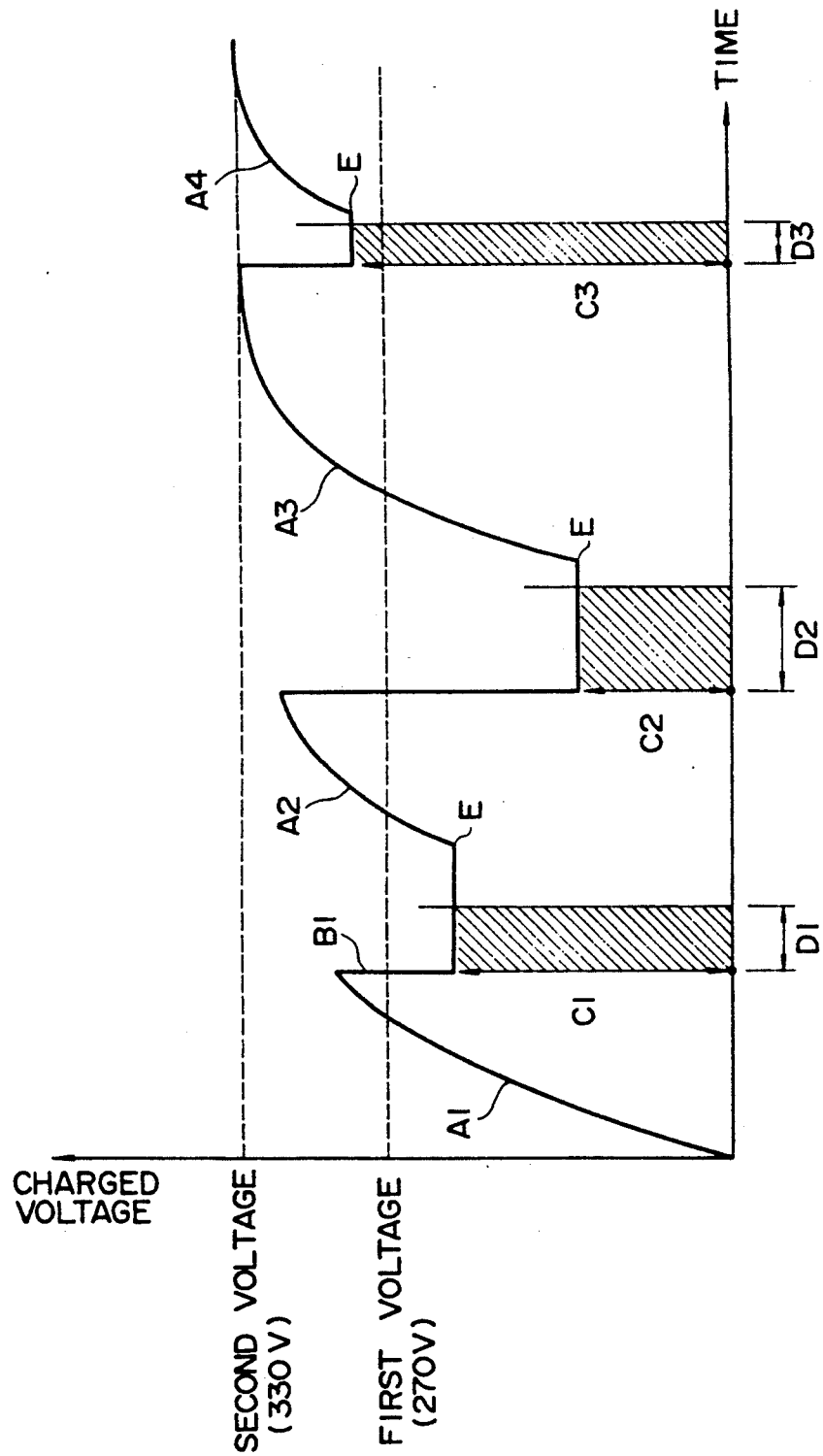
FIG. 4 is a graph showing chronological changes of a charged voltage of the condenser.

FIG. 4 shows chronological changes of the charged voltage of the main condenser 13 according to the present embodiment, which shows the case where the charging starts when the voltage of the main condenser 13 is OV.

First, the voltage of the main condenser 13 increases smoothly by the voltage applied by the voltage increasing circuit 12, as indicated by symbol A1. After the charged voltage reaches a first charge voltage, the xenon tube 14 becomes capable of emitting light. If the release switch 32 is turned ON by depressing the release button 55, the xenon tube 14 is caused to emit light, and the voltage of main condenser 13 drops rapidly, as indicated by symbol B1. During the light emission, the flash control circuit integrates the amount of the reflected light from the object received by the light receiving element and obtains the luminance of the object. When the integrated luminance of the object corresponds to an appropriate exposure value which is calculated from a film sensitivity, aperture value, shutter speed, and so on, the switching element 41 is turned OFF, and the light emission of the xenon tube 14 is ceased. When the light emission is completed, the main condenser 13 represents a voltage indicated by a symbol C1.

After the light emission, the main condenser 13 needs to be recharged. According to the present embodiment, recharging is prohibited for a period of time in accordance with the voltage of the main condenser 13. The recharging of the main condenser 13 is prohibited in such a fashion that the lower the voltage of the main condenser, the longer the period in which recharging is prohibited. When the voltage of the main condenser 13 is low, it is deemed that the period necessary for charging the main condenser 13 becomes long and relatively large amount of heat is generated. Accordingly, in order to avoid the voltage increasing circuit 12 to be excessively heated, a relatively longer period of prohibiting charging is set. After the recharge prohibit period (D1, D2, or D3), which is determined in accordance with the voltage of the main condenser (C1, C2, or C3), has elapsed, the main condenser is recharged (A2, A3, or A4). The recharge and prohibition of the recharge will be similarly performed successively.

It should be noted that after the recharge prohibit period has elapsed, it is deemed that the voltage increasing circuit 12 is sufficiently heat-radiated. Accordingly, thereafter, the charging of the main condenser 13 can be started any time when the flash light is necessary as indicated by a symbol E. Further, the maximum charged voltage of the main condenser 13 is the second voltage (for example, 330 V), and when the voltage of the main condenser 13 reaches this second voltage, charging is ceased.

Figure 5:
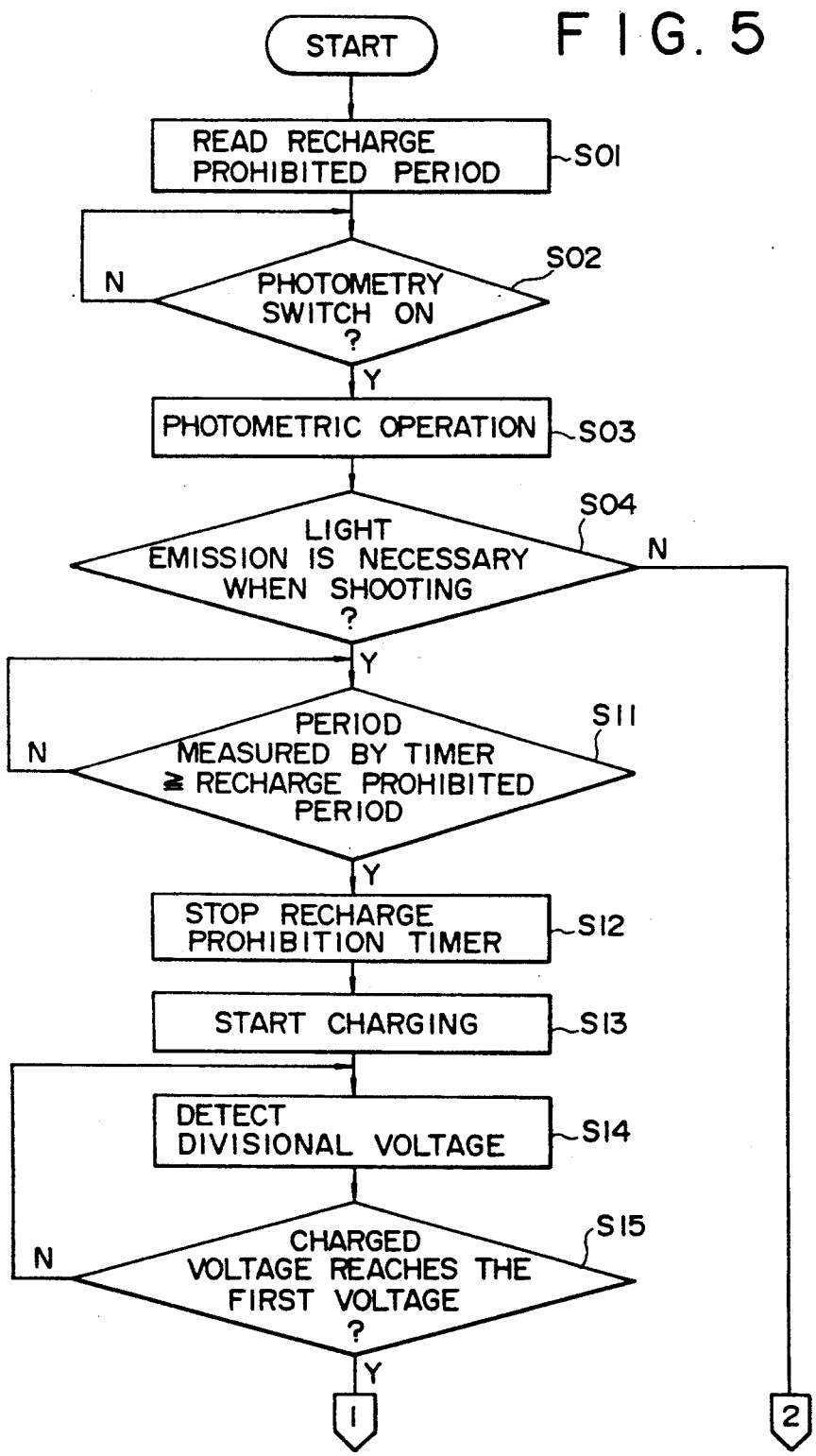

FIG. 5 and FIG. 6 are flow charts illustrating the control of photographic action in which the embodiment of the present invention is employed.

First of all, in Step S01, the recharge prohibit period is read from a memory. The recharge prohibited period is the period of time during which the recharge of the main condenser 13 is prohibited after the emission of the flash light. The recharge prohibition period is stored in a memory in Step S35, which will be described later. It should be noted that the recharge prohibited period is set to 0 when the initial settings are executed when a main switch of the camera is turned ON. In other words, the initial value for recharge prohibited period is 0.

The photometric switch 31 is turned ON when the release button 55 is depressed halfway. If the photometric switch 31 is turned ON, a photometric operation is carried out by the photometric circuit 33, and the luminance of an object is obtained (in steps S02 and S03). In accordance with the obtained luminance, it is determined whether the flash light is necessary for photographic shooting in step S04. If it is determined that no flash light is used, it is detected whether the release button 55 is fully depressed and the release switch 32 is turned ON in step S05. If the release button 55 is fully depressed, a normal exposure control is performed, and photographic shooting is executed in accordance with the calculated aperture value and shutter speed in step S06. Thus, control of photographing is completed.

If it is determined that the flash light is necessary in step S04, a period of time which is measured by a recharge prohibition timer 43, and the recharge prohibit period are compared in step S11. If it is determined that the period of time measured by the recharge prohibition timer 43 is equal to or larger than the recharge prohibited period, the recharge prohibition timer 43 is stopped (at step S12), the voltage increasing circuit 12 is actuated, and charging of the main condenser 13 is started (at step S13). As described later, the recharge prohibition timer 43 is started in step S36 and the recharge prohibition timer 43 measures the period of time having been elapsed since the recharge was prohibited. It should be noted that the initial value of the recharge prohibition timer 43 has been set to 0 when the main switch of the camera is turned ON. Accordingly, when the process of step S11 is executed the first time, since both the recharge prohibition timer 43 and the recharge prohibited period have been set to 0, the process advances from step S11 to step S12.

Thus, the voltage of main condenser 13 is increased as indicated by symbols A1, A2, A3, and A4 in FIG. 4. The divisional voltage of the main condenser 13 is outputted by the charged voltage detecting circuit 16, and the charged voltage of the main condenser is calculated thereupon at step S14 until the charge voltage reaches the first voltage.

When the voltage of the main condenser 13 reaches the first voltage, it is determined whether the release switch 32 is turned ON at step S21. If the release switch 32 is not in the ON state, the detection of the release switch is continued until the charge voltage reaches the second voltage (for example, 330 V) in steps S21 through S24. When the voltage of the main condenser 13 reaches the second voltage, the charging is ceased in step S25, and it is detected whether the release switch 32 is turned ON at step S26.

When it is detected that the release switch 32 is turned ON in step S21, the charging of the main condenser S22 is stopped and processing continues to step S31.

The photographic shooting with emitting the flash light is executed as illustrated in steps S31 through S33. First, the flash control circuit 42 outputs the switching signal in response to the flash control signal transmitted from port 11b of the system controller 11. Upon receipt of the switching signal, the switching element 41 is turned ON, and the voltage of the main condenser 13 is applied to the xenon tube 14 (step S31). Then, the xenon trigger circuit 15 outputs a trigger signal so that the xenon tube 14 emits light simultaneously with the exposure control of the camera 100 (step S32). During the light emission, the flash control circuit 42 detects the amount of the reflected light from the object. When the sufficient amount of light is obtained, the flash control circuit 42 is controlled to turn OFF the switching element 41, thereby the light emission being ceased (step S33).

Thereafter, the voltage of the main condenser 13 is determined based on the divisional voltage signal transmitted by the charged voltage detecting circuit 16 at step S34. Then, the recharge prohibit period is determined in accordance with the voltage of the main condenser 13 detected at step S35. The voltage of the main condenser 13 is determined by applying an A/D conversion to the divisional voltage signal at step S34. The recharge prohibit period can be obtained, for example, by reverting the converted value. That is, the recharge prohibited period is obtained by:

(1) obtaining a complimental value of the converted binary value of the divisional voltage signal with respect to 1 (one);

(2) converting the complimental binary value to a decimal value; and (3) multiplying the decimal value by a predetermined coefficient.

After the recharge prohibit period is determined as above, the recharge prohibition timer 43 is reset and started to measure a period of time since the recharge was prohibited. The period measured by the recharge prohibition timer 43 is referred to at step S11 as aforementioned.

As described above, according to the present invention, it is deemed that the lower the voltage of the main condenser is, the larger the magnitude of heat generated in the voltage increasing circuit 12 in the successive charging of the main condenser is, and it is so controlled that the recharge of the main condenser 13 is prohibited for a relatively longer period of time to allow heat to be sufficiently radiated. Accordingly, heat generation of the voltage increasing circuit 12 is sufficiently suppressed, and destruction of the voltage increasing circuit 12 is prevented. Further, if the heat generation is less, it is possible to commence the recharge relatively promptly after the flash light has been emitted, so that the flash device can be used repeatedly within a short period of time.

Further, according to the present invention, there is no need to provide a circuit for detecting the temperature of the voltage increasing circuit in order to prevent the heat generation thereof. Accordingly, the flash device can be made compact in size.

Optionally, if the voltage of the power source 17 is relatively low, the electric current flowing through the voltage increasing circuit 12 is less and the heat generated therein is also less. Accordingly, if the voltage of the power source 17 is relatively low, the recharge prohibited period can be controlled to be short.

As described above, according to the present invention overheating of the voltage increasing circuit can be prevented. Moreover, it is possible to commence the recharge of the condenser as quickly as possible after the flash light has emitted.

The present disclosure relates to a subject matter contained in Japanese Patent Application No. HEI 3-102199 (filed on Feb. 7, 1991) which is expressly incorporated herein by reference in its entirety.

What is claimed is:

1. A flashing device for emitting light, comprising means for emitting light, a condenser that is charged and supplies electricity to said means for emitting light, and means for charging said condenser, said flashing device further comprising:

means for detecting a residual voltage of said condenser after said emitting means emits light;

means for determining a charging prohibit period in accordance with said detected residual voltage of said condenser; and means for prohibiting said charging of said condenser for said charging prohibit period which is determined by said determining means after said emitting means emits light.

2. The flashing device of claim 1, wherein said means for determining a period of time determines said period in such a fashion that the lower said residual voltage of said condenser, the longer said charging prohibit period.

3. The flashing device of claim 1, wherein said charging means stops charging said condenser when said condenser is charged to another predetermined voltage which is higher than said predetermined voltage.

4. A flashing device that is employed in a camera for emitting light towards an object, comprising means for emitting light, a condenser for being charged and supplying electricity to said light emitting means, and means for charging said condenser, said flashing device further comprising:

means for detecting a residual voltage of said condenser after said emitting means emits light;

means for determining a charging prohibit period in accordance with said residual voltage of said condenser; and means for prohibiting said charging of said condenser for said charging prohibit period which is determined by said determining means after said emitting means emits light.

5. The flashing device of claim 4, wherein said means for determining a period of time determines said period in such a fashion that the lower said residual voltage of said condenser, the longer said charging prohibit period.

6. The flashing device of claim 4, wherein said charging means stops charging said condenser when said condenser is charged to another predetermined voltage which is higher than said predetermined voltage.

7. The flashing device of claim 4, wherein said camera comprises means for determining whether flash light is to be emitted when an exposure occurs, and wherein said emitting means emits light when it is determined by said determining means that said flash light is necessary and when a shutter of said camera is driven.

8. The flashing device of claim 7, wherein said emitting means is capable of emitting light when a voltage of said condenser is higher than, or equal to, said predetermined voltage.

9. The flashing device of claim 8, wherein said charging means stops charging said condenser when said detecting means detects another predetermined voltage that is higher than said predetermined voltage.

10. The flashing device of claim 8, wherein said charging means stops charging said condenser when said shutter is driven.

11. The flashing device of claim 1, further comprising an automatic strobe that is capable of controlling an amount of light emitted by said emitting means.

12. A method of recharging a charging means that is provided in a flashing device after a flash light is emitted, the flashing device having a condenser that supplies electricity to an illuminating means, the condenser being charged by the charging means, and a power source for supplying electricity to the charging means, the method comprising the steps of:
- detecting a residual voltage of the condenser after the flash light has been emitted;
- determining a charging prohibit period in accordance with the residual voltage of the condenser; and
- prohibiting the charging of the condenser for the charging prohibit period after the illuminating means has emitted light.

13. A camera having a flashing device for emitting light, comprising means for emitting light, a condenser that is charged and supplies electricity to said light emitting means, and means for charging said condenser, said camera further comprising:
- means for detecting a residual voltage of said condenser after said light emitting means emits light;
- means for determining a charging prohibit period in accordance with said residual voltage of said condenser; and
- means for prohibiting said charging of said condenser for said charging prohibit period, which is determined by said determining means after said emitting means emits light.

14. The camera of claim 13, wherein said flashing device comprises an automatic strobe that is capable of controlling an amount of light that is emitted by said light emitting means.

15. A flashing device for emitting light, comprising means for emitting flash light, means for controlling an amount of said flash light, a condenser that is charged and supplies electricity to said light emitting means, and means for charging said condenser, said flashing device further comprising:
- means for detecting a residual voltage of said condenser after said light emitting means emits light;
- means for determining a charging prohibit period in accordance with said detected residual voltage of said condenser; and
- means for prohibiting said charging of said condenser for said charging prohibit period, which is determined by said determining means after said light emitting means emits light.

16. The flashing device of claim 15, wherein said determining means determines said charging prohibit period in such a fashion that the lower said residual voltage of said condenser, the longer said charging prohibit period.

17. A flashing device for emitting light to an object, comprising means for emitting light, a condenser that is charged and supplies electricity to said means for emitting light, and switch means for turning OFF said means for emitting light when an amount of light emitted onto an object reaches a predetermined value, said flashing device further comprising:
- means for detecting a residual voltage of said condenser when said means for emitting light is turned OFF by said switch means;
- means for determining a charging prohibit period in accordance with said detected residual voltage of said condenser; and
- means for prohibiting said charging of said condenser for said charging prohibit period after said means for emitting light has been turned OFF.

18. The flashing device of claim 17, wherein said determining means determines said charging prohibit period in such a fashion that the lower said residual voltage of said condenser, the longer said charging prohibit period.

* * * * *